(12) United States Patent
Hammond

(10) Patent No.: US 7,568,931 B2
(45) Date of Patent: Aug. 4, 2009

(54) INTEGRATED POWER CELL BYPASS ASSEMBLY AND POWER SUPPLY INCLUDING SAME

(75) Inventor: Peter Willard Hammond, Greensburg, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/861,608

(22) Filed: Sep. 26, 2007

(65) Prior Publication Data

US 2008/0088186 A1 Apr. 17, 2008

Related U.S. Application Data

(60) Provisional application No. 60/848,324, filed on Sep. 28, 2006.

(51) Int. Cl.
*H01R 13/62* (2006.01)

(52) U.S. Cl. ............... 439/263; 439/500; 307/10.7

(58) Field of Classification Search .............. 439/248, 439/263, 500, 504; 307/10.1, 10.7, 11
See application file for complete search history.

(56) References Cited

U.S. PATENT DOCUMENTS

| | | | |
|---|---|---|---|
| 5,625,545 A | 4/1997 | Hammond | |
| 5,986,909 A | 11/1999 | Hammond et al. | |
| 5,993,250 A * | 11/1999 | Hayman | 439/504 |
| 6,222,284 B1 | 4/2001 | Hammond et al. | |
| 6,632,103 B1 * | 10/2003 | Liu | 439/504 |
| 6,913,483 B2 * | 7/2005 | Restaino et al. | 439/504 |
| 7,252,558 B2 * | 8/2007 | Cottle | 439/822 |
| 7,452,235 B2 * | 11/2008 | Davis et al. | 439/504 |

* cited by examiner

*Primary Examiner*—Khiem Nguyen
(74) *Attorney, Agent, or Firm*—Michael J. Wallace

(57) ABSTRACT

A bypass assembly. The bypass assembly includes a plurality of movable terminals configured to mate with fixed terminals of a power cell of a power supply. At least one of the movable terminals and its corresponding fixed terminal collectively form a contact when the at least one of the movable terminals and the corresponding fixed terminal are mated.

17 Claims, 18 Drawing Sheets

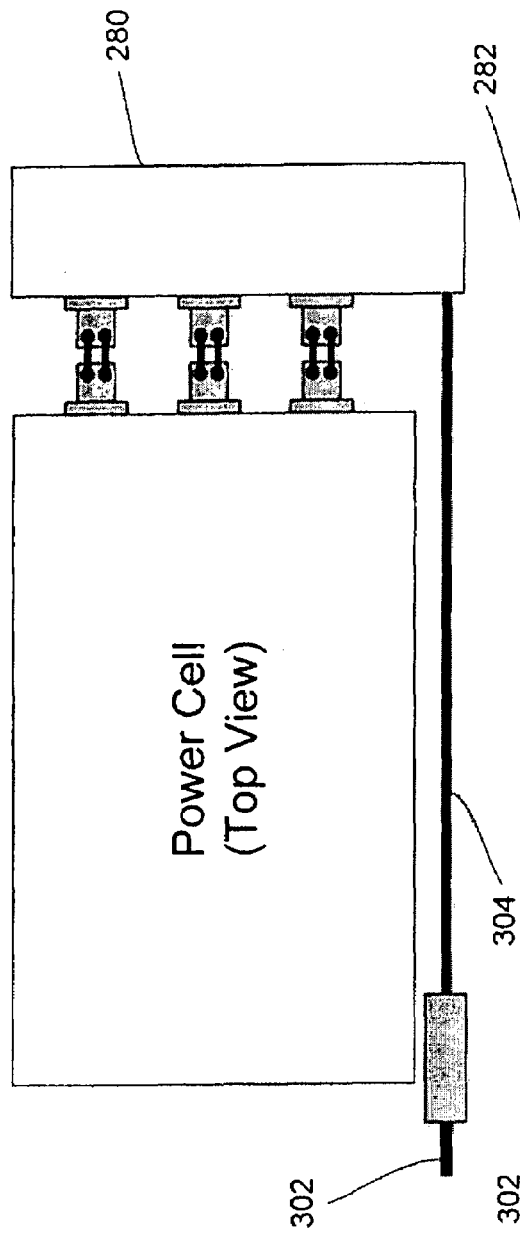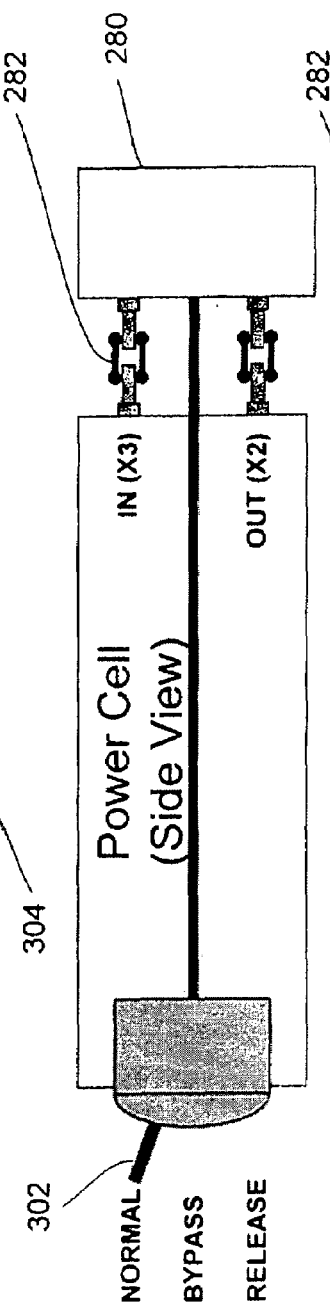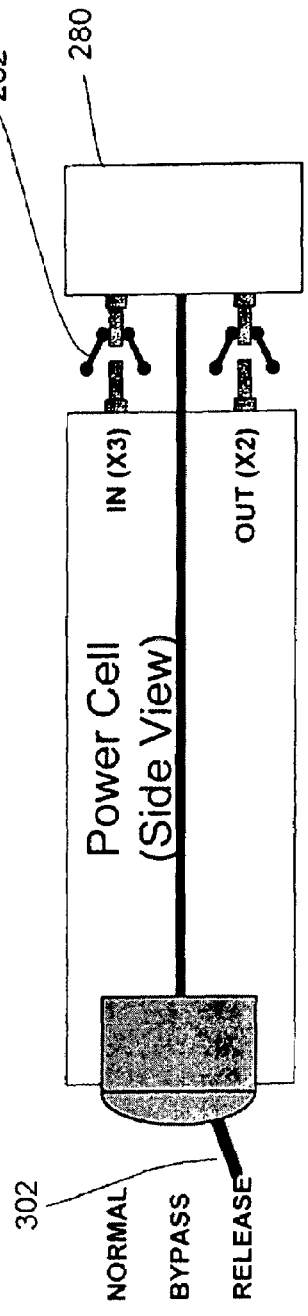
FIG. 13A
FIG. 13B
FIG. 13C

INTEGRATED POWER CELL BYPASS ASSEMBLY AND POWER SUPPLY INCLUDING SAME

CROSS REFERENCE TO RELATED APPLICATION

This application claims the priority benefit of U.S. Provisional Patent Application No. 60/848,324, filed on Sep. 28, 2006. This application is related to U.S. application Ser. No. 11/861,723 filed Sep. 26, 2007, entitled "Method For Operating A Multi-Cell Power Supply Having An Integrated Power Cell Bypass Assembly".

BACKGROUND

This application disclosed an inention that is related, generally and in various embodiments, to an intergrated power cell bypass assembly, and a power supply including same.

In certain applications, multi-cell power supplies utilize modular power cells to process power between a source and a load. Such modular power cells can be applied to a given power supply with various degrees of redundancy to improve the availability of the power supply. For example, FIG. 1 illustrates various embodiments of a power supply (e.g., an AC motor drive) having nine such power cells. The power cells in FIG. 1 are represented by a block having input terminals A, B, and C; and output terminals T1 and T2. In FIG. 1, a transformer or other multi-winding device 110 receives three-phase, medium-voltage power at its primary winding 112, and delivers power to a load 130 such as a three-phase AC motor via an array of single-phase inverters (also referred to as power cells). Each phase of the power supply output is fed b a group of series-connected power cells, called herein a "phase-group". As shown in FIG. 1, according to various embodiments, the primary winding 112 may receive its power via a main contactor 111. The main contactor 111 ma be embodied as a vacuum contactor.

The transformer 110 includes primary windings 112 that excite a number of secondary windings 114-122. Although primary winding 112 is illustrated as having a star configuration, a mesh configuration is also possible. Further, although secondary windings 114-122 are illustrated as having a delta or an extended-delta configuration, other configurations of windings may be used as described in U.S. Pat. No. 5,625,545 to Hammond, the disclosure of which is incorporated herein by reference in its entirety. In the example of FIG. 1 there is a separate secondary winding for each power cell. However, the number of power cells and/or secondary windings illustrated in FIG. 1 is merely exemplary, and other numbers are possible. Additional details about such a power supply are disclosed in U.S. Pat. No. 5,625,545.

Any number of ranks of power cells are connected between the transformer 110 and the load 130. A "rank" in the context of FIG. 1 is considered to be a three-phase set, or a group of three power cells established across each of the three phases of the power delivery system. Referring to FIG. 1, rank 150 includes power cells 151-153, rank 160 includes power cells 161-163, and rank 170 includes power cells 171-173. A master control system 195 sends command signals to local controls in each cell over fiber optics or another wired or wireless communications medium 190. It should be noted that the number of cells per phase depicted in FIG. 1 is exemplary, and more than or less than three ranks may be possible in various embodiments.

FIG. 2 illustrates various embodiments of a power cell 210 which is representative of various embodiments of the power cells of FIG. 1. The power cell 210 includes a three-phase diode-bridge rectifier 212, one or more direct current (DC) capacitors 214, and an N-bridge inverter 216. The rectifier 212 converts the alternating current (AC) voltage received at cell input 218 (i.e., at input terminals A, B and C) to a substantially constant DC voltage that is supported by each capacitor 214 that is connected across the output of the rectifier 212. The output stage of the power cell 210 includes an H-bridge inverter 216 which includes two poles, a left pole and a right pole, each with two switching devices. The inverter 216 transforms the DC voltage across the DC capacitors 214 to an AC output at the cell output 220 (i.e., across output terminals T1 and T2) using pulse-width modulation (PWM) of the semiconductor devices in the H-bridge inverter 216.

As shown in FIG. 2, the power cell 210 may also include fuses 222 connected between the cell input 218 and the rectifier 212. The fuses 222 may operate to help protect the power cell 210 in the event of a short-circuit failure. According to other embodiments, the power cell 210 is identical to or similar to those described in U.S. Pat. No. 5,986,909 and its derivative U.S. Pat. No. 6,222,284 to Hammond and Aiello, the disclosures of which are incorporated herein by reference in their entirety.

FIG. 3 illustrates various embodiments of a bypass device 230 connected to output terminals T1 and T2 of the power cell 210 of FIG. 2. In general, when a given power cell of a multi-cell power supply fails in an open-circuit mode, the current through all the power cells in that phase-group will go to zero, and further operation is not possible. A power cell failure may be detected by comparing a cell output voltage to the commanded output, by checking or verifying cell components, through the use of diagnostics routines, etc. In the event that a given power cell should fail, it is possible to bypass the failed power cell and continue to operate the multi-cell power supply at reduced capacity.

The bypass device 230 is a single pole single throw (SPST) contactor, and includes a contact 232 and a coil 234. As used herein, the term "contact" generally refers to a set of contacts having stationary portions and a movable portion. Accordingly, the contact 232 includes stationary portions and a movable portion which is controlled by the coil 234. The bypass device 230 may be installed as an integral part of a converter subassembly in a drive unit. In other applications the bypass device 230 may be separately mounted. When the movable portion of the contact 232 is in a bypass position, a shunt path is created between the respective output lines connected to output terminals T1 and T2 of the power cell 210. Stated differently, when the movable portion of the contact 232 is in a bypass position, the output of the failed power cell is shorted. Thus, when power cell 210 experiences a failure, current from other power cells in the phase-group can be carried through the bypass device 230 connected to the failed power cell 210 instead of through the failed power cell 210 itself.

FIG. 4 illustrates various embodiments of a different bypass device 240 connected to output terminals T1 and T2 of the power cell 210. The bypass device 240 is a single pole double throw (SPDT) contactor, and includes a contact 242 and a coil 244. The contact 242 includes stationary portions and a movable portion which is controlled by the coil 244. When the movable portion of the contact 242 is in a bypass position, one of the output lines of the power cell 210 is disconnected (e.g., the output line connected to output terminal T2 in FIG. 4) and a shunt path is created between the output line connected to output terminal T1 of the power cell 210 and a downstream portion of the output line connected to output terminal T2 of the power cell 210. The shunt path carries current from other power cells in the phase group which would otherwise pass through the power cell 210. Thus, when power cell 210 experiences a failure, the output of the failed power cell is not shorted as is the case with the bypass configuration of FIG. 3.

The bypass devices shown in FIGS. 3 and 4 do not operate to disconnect power to any of the input terminals A, B or C in the event of a power cell failure. Thus, in certain situations, if the failure of a given power cell is not severe enough to cause the fuses 222 (see FIG. 2) to disconnect power to any two of input terminals A, B or C, the failure can continue to cause damage to the given power cell.

FIG. 5 illustrates various embodiments of a system 250 for bypassing a power cell (e.g. power cell 210) of a power supply. As shown in FIG. 5, the system 250 includes bypass device 252 connected to the output terminals T1 and T2, a bypass device 254 connected to input terminal A, and a bypass device 256 connected to input terminal C. Although the system 250 is shown in FIG. 5 as having respective bypass devices connected to input terminals A and C, it will be appreciated that, according to other embodiments, the respective bypass devices may be connected to any two of the input terminals A, B and C. In various implementations, the bypass devices 252, 254, 256 may be mechanically-driven, fluid-driven, electrically-driven, or solid state, as is described in the '909 and '284 patents.

According to various embodiments, bypass device 252 is a single pole double throw (SPDT) contactor, and includes a contact 258 and a coil 260. The contact 258 includes stationary portions and a movable portion which is controlled by the coil 260. The bypass device 252 operates in a manner similar to that described hereinabove with respect to bypass device 240 of FIG. 4. The bypass device 254 is a single pole single throw (SPST) contactor, and includes a contact 262 and a coil 264. The contact 262 includes stationary portions and a movable portion which is controlled by the coil 264. The bypass device 256 is a single pole single throw (SPST) contactor, and includes a contact 266 and a coil 268. The contact 266 includes stationary portions and a movable portion which is controlled by the coil 268. In general, in the event of a failure, bypass devices 254, 256 disconnect the cell input power at substantially the same time that bypass device 252 creates a shunt path for the current that formerly passed through the failed power cell.

The condition associated with the creation of the described shunt path and the disconnection of cell input power from at least two of the cell input terminals may be referred to as "full-bypass". When the full bypass condition is present, no further power can flow into the failed cell. As described with respect to FIG. 2, the fuses 222 of the power cell may operate to help protect the power cell in the event of a short-circuit failure. However, in certain situations (e.g., when the available fault current is low), the fuses 222 may not clear quickly enough to prevent further damage to the failed power cell. According to various embodiments, the bypass devices 254, 256 are configured to act quicker than the fuses 222, and the quicker action generally results in less damage to the failed power cell. According to various implementations, the main contactor 111 may interrupt power to the transformer 110 before the bypass devices 254, 256 act to disconnect the two power cell inputs.

FIG. 6 illustrates a simplified representation of various views (i.e. top, side and rear) of a power cell (e.g., power cell 210) of a power supply according to various embodiments. The power cell includes a plurality of fixed terminals 270 which serve as connection terminals for the power cell. The fixed terminals 270 may be embodied in any suitable shape or configuration. For purposes of simplicity, the fixed terminals 270 will be described hereinafter in the context of male stab plugs 270. With the male stab plugs 270, a failed power cell can be quickly and easily disconnected, removed, and replaced with another power cell. For the embodiments shown in FIG. 6, the power cell includes five male stab plugs 270 (see the rear view) which correspond to input terminals A, B and C and output terminals T1 and T2 of the power cell. According to other embodiments, the power cell may include more than or less than five male stab plugs 270, and the male stab plugs 270 may be shaped, located and/or arranged in a manner which is different than that shown in FIG. 6.

FIG. 7 illustrates a simplified representation of the power cell of FIG. 6 being installed in a power supply. For purposes of clarity, only a portion of the power supply is shown in FIG. 7. The power supply includes a plurality of fixed female receptacles 272 which correspond to and are respectively aligned with the male stab plugs 270, a first insulating member 274, and a second insulating member 276. As shown in FIG. 7, the first insulating member 274 is connected to the second insulating member 276, the fixed female receptacles 272 are connected to the first insulating member 274, and the second insulating member 276 supports the weight of the power cell. As the power cell is moved toward the first insulating member 274, the male stab plugs 270 of the power cell respectively engage the corresponding fixed female receptacles 272 to form electrical connections. The fixed female receptacles 272 may be connected to other circuits via conductors 278 such as cables, bus bars, etc. Each male stab plug 270 and the corresponding fixed female receptacle 272 may collectively be considered a stab assembly.

In general, electrical contacts (e.g., bypass contacts 258, 262, 266 of FIG. 5) are less reliable than permanent connections such as cables or bus bars. For a given electrical contact, the contacting surfaces may become contaminated over time, thereby increasing the electrical resistance of the contact. The increased resistance may lead to higher operating temperatures while conducting current, which may accelerate the contamination process. Also, mechanical wear or misalignment may over time reduce the force holding the surfaces in contact, thereby leading to higher operating temperatures while conducting current. For similar reasons, stab connections such as those described with respect to the male stab plugs 270 and fixed female receptacles 272 also tend to be less reliable than permanent connections such as cables or bus bars.

For multi-cell power supplies or drives equipped with both cell bypass (e.g., full bypass as shown in FIG. 5) and stab connections (e.g., as shown in FIG. 7), the current into and out of the cell must generally flow through two sets of electrical contacts in series, namely the stab connections (i.e., the connections between the male stab plugs 270 and the corresponding fixed female receptacles 272) and the bypass contacts (i.e., contacts 258, 262, 266 of FIG. 5).

SUMMARY

In one general respect, this application discloses a bypass assembly for bypassing a power cell in a multi-cell power supply. According to various embodiments, the bypass assembly includes a plurality of movable terminals configured to mate with fixed terminals of a power cell of a power supply. At least one of the movable terminals and its corresponding fixed terminal collectively form a contact when the at least one of the movable terminals and the corresponding fixed terminal are mated.

In another general respect, this application discloses a power supply. According to various embodiments, the power supply includes a plurality of power cells, and a plurality of bypass assemblies. At least one of the power cells includes a plurality of fixed terminals. At least one of the bypass assemblies includes a plurality of movable terminals configured to mate with the fixed terminals of the at least one power cell. At least one of the movable terminals and its corresponding fixed terminal collectively form a contact when the at least one of the movable terminals and the corresponding fixed terminal are mated.

DESCRIPTION OF THE DRAWINGS

Various embodiments of the invention are described herein by way of example in conjunction with the following figures.

FIGS. 13A-C illustrate simplified representations of various views of a multi-cell power supply according to various embodiments;

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 7:
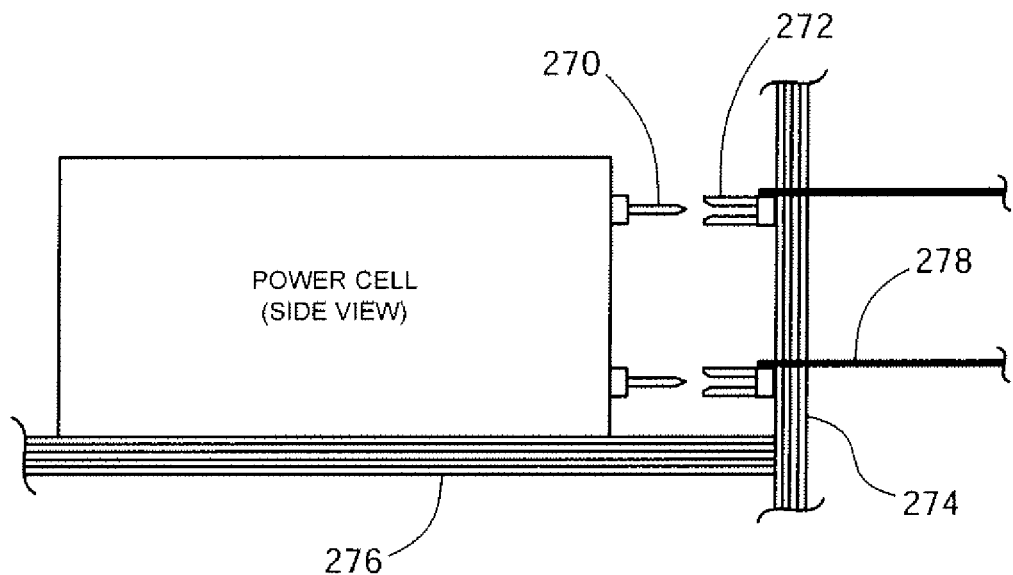
FIG. 7 illustrates a simplified representation of the power cell of FIG. 6 being install in a power supply.
Figure 8:
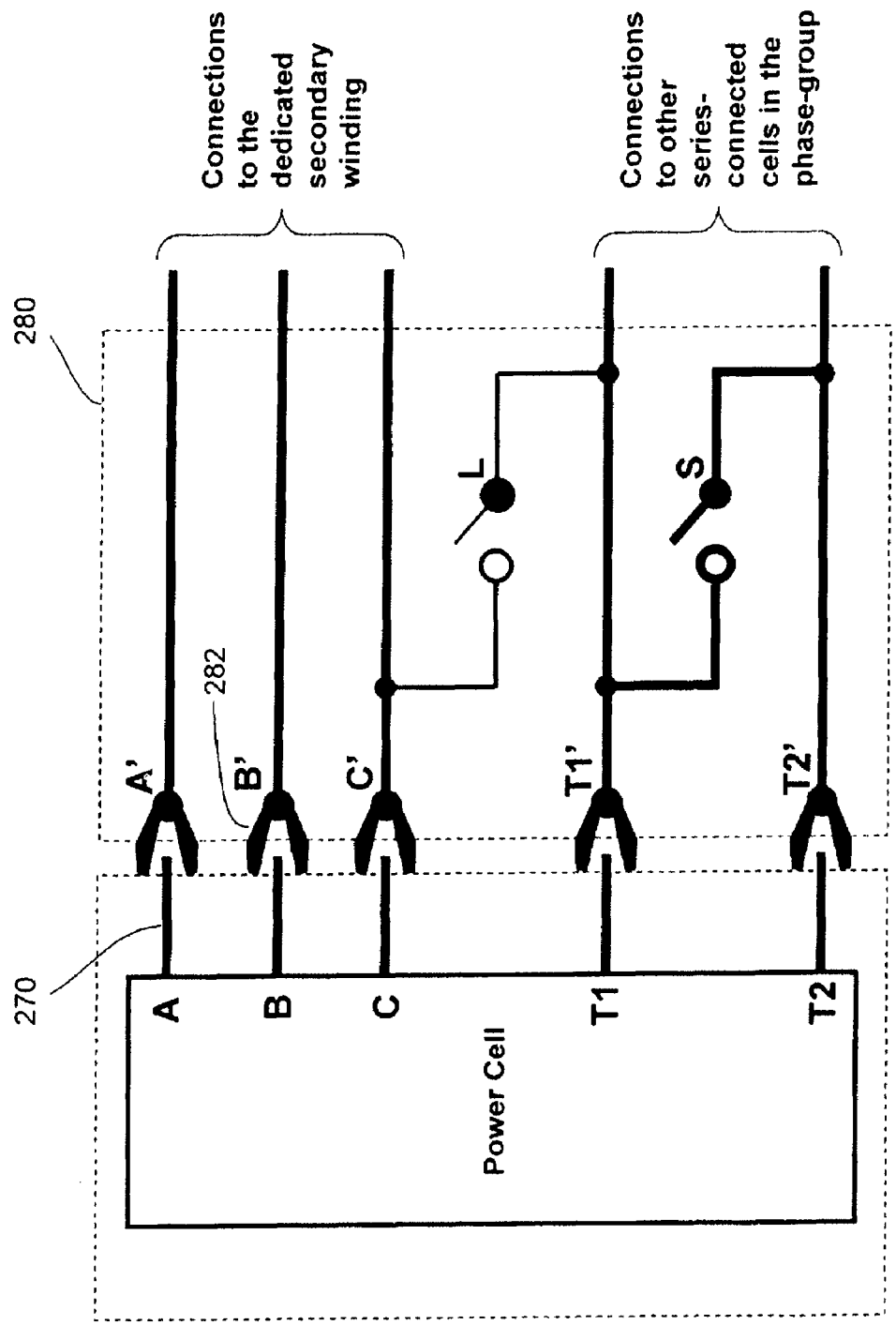
FIG. 8 illustrates various embodiments of a bypass assembly.

FIG. 8 illustrates various embodiments of a bypass assembly 280. The bypass assembly 280 includes a plurality of movable terminals 282 which are configured to mate with corresponding fixed terminals 270 of a power cell (e.g., the power cell of FIG. 7). The plurality of movable terminals 282 serve as connection terminals for the bypass assembly 280. The movable terminals 282 may be embodied in any suitable shape or configuration. As described in more detail hereinafter, a given movable terminal 282 and its corresponding fixed terminal 270 collectively form a contact when the movable terminal 282 and the fixed terminal 270 are mated. For purposes of simplicity, the movable terminals 282 will be described hereinafter in the context of female receptacles 282 configured for receiving male stab plugs 270. As shown in FIG. 8, the male stab plugs 270 correspond to input terminals A, B, C and output terminals T1, T2 of the power cell, and the female receptacles 282 correspond to terminals A', B', C', T1', T2' of the bypass assembly 280. Each male stab plug 270 and the corresponding female receptacle 282 may collectively be considered a stab assembly.

Figure 5:
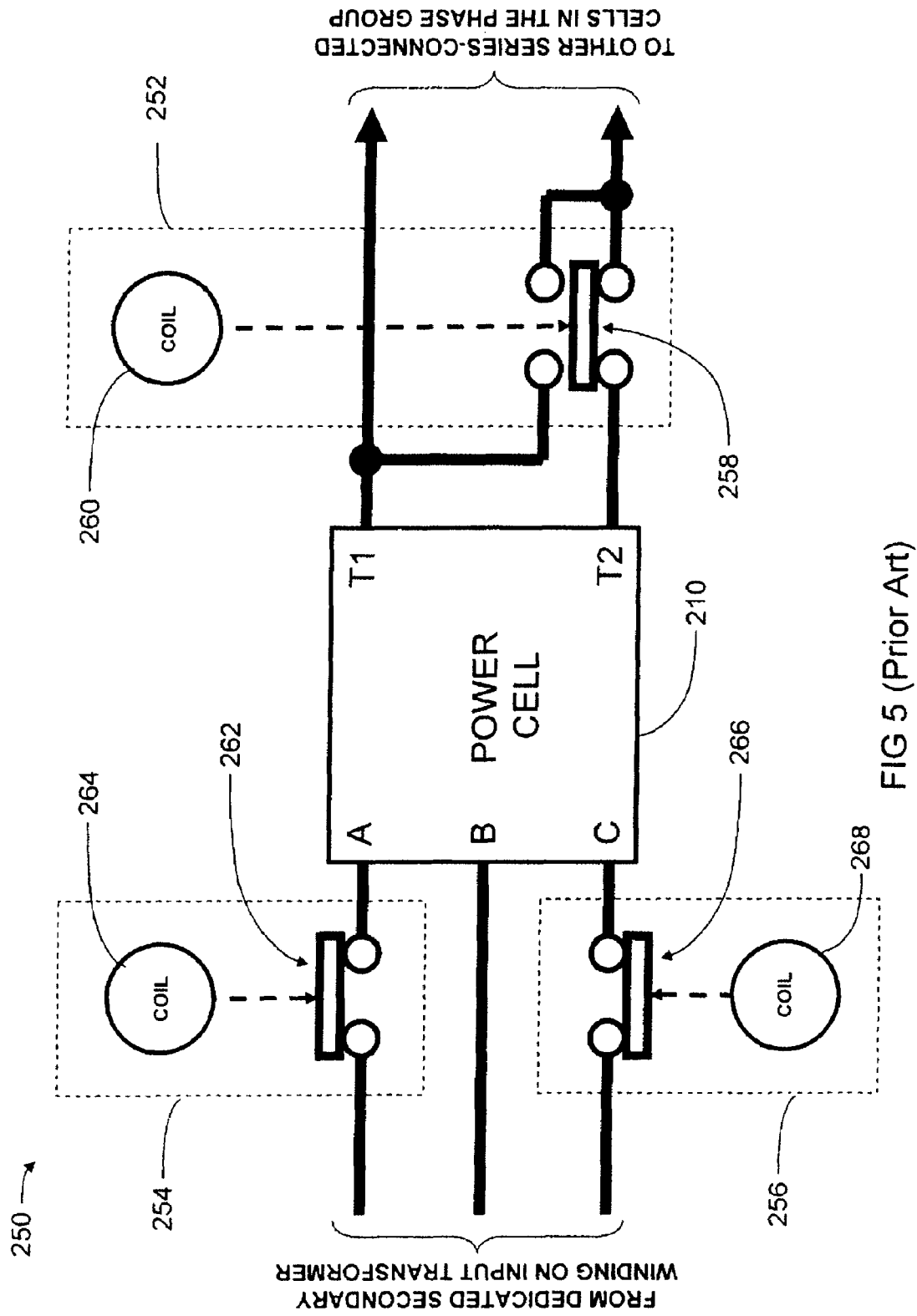
Figure 6:
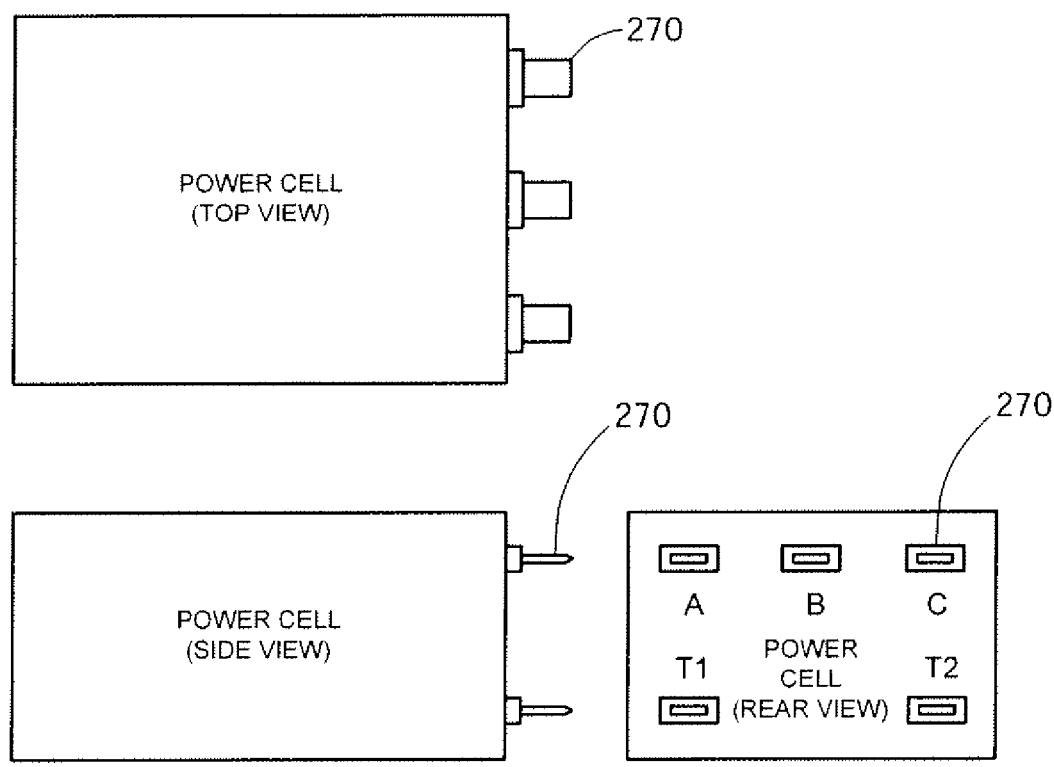
FIG. 6 illustrates a simplified representation of various views of a power cell of a power supply according to various embodiments.

According to various embodiments, the bypass assembly 280 also includes a first switching device L connected between the female receptacles C', T', and a second switching device S connected between female receptacles T1', T2'. According to other embodiments, an impedance device such as, for example, a resistor, may be utilized in lieu of switching device L. As described in more detail hereinafter, the bypass assembly 280 includes a portion of a stab assembly (e.g., the female portion), provides the bypass functionality of the system 250 of FIG. 5, and also provides disconnect functionality. By providing both bypass and disconnect functionality, the bypass assembly 280 may be considered an integrated bypass assembly.

As shown in FIG. 8, the female receptacles 282 may be embodied as jaw-like receptacles which include a first jaw member and a second jaw member movable between an open position (shown in FIG. 8) and a closed position. The first jaw member may be considered an "upper" jaw member and the second jaw member may be considered a "lower" jaw member. According to various embodiments, the jaw-like receptacles may be configured to move up and down relative to a floor, left and right relative to a floor, etc. According to other embodiments, the female receptacle 282 is embodied as one of the first and second jaw members. When the female receptacles 282 are in the open position, the female receptacles 282 are in a position to receive the male stab plugs 270 of the power cell, and there is no electrical connection between the power cell and the bypass assembly 280. When the male stab plugs 270 of the power cell are received by the corresponding female receptacles 282, and the female receptacles 282 are placed into the closed position, the female receptacles 282 make physical contact with the corresponding male stab plugs 284, thereby making an electrical connection between the power cell and the bypass assembly 280. According to other embodiments, a given female receptacle 282 may be embodied as a portion of a jaw-like assembly (e.g. only one of the upper and lower members), as a female portion of a plunger-style contact, etc.

Figure 1:
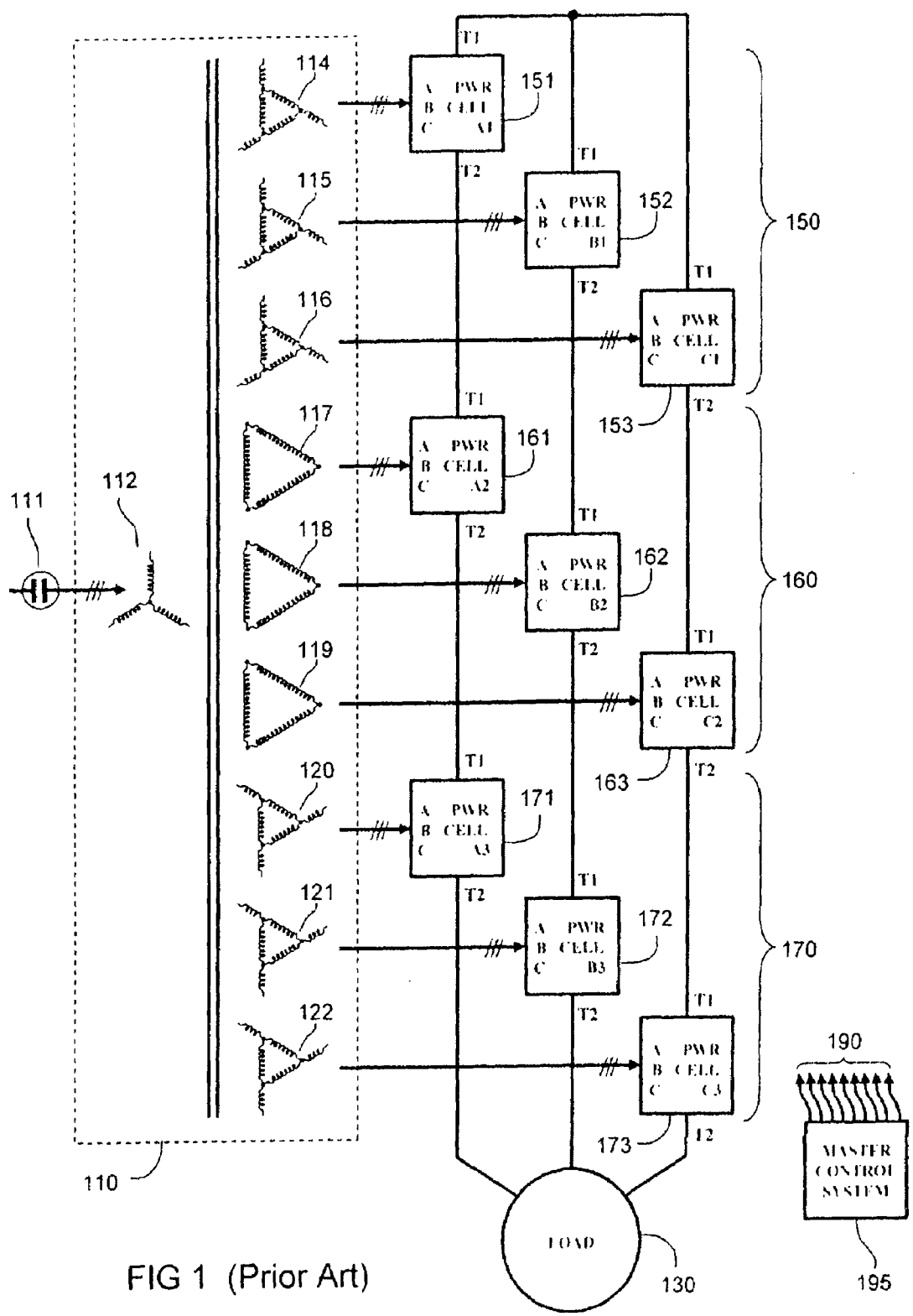
FIG. 1 illustrates various embodiments of a power supply.
Figure 2:
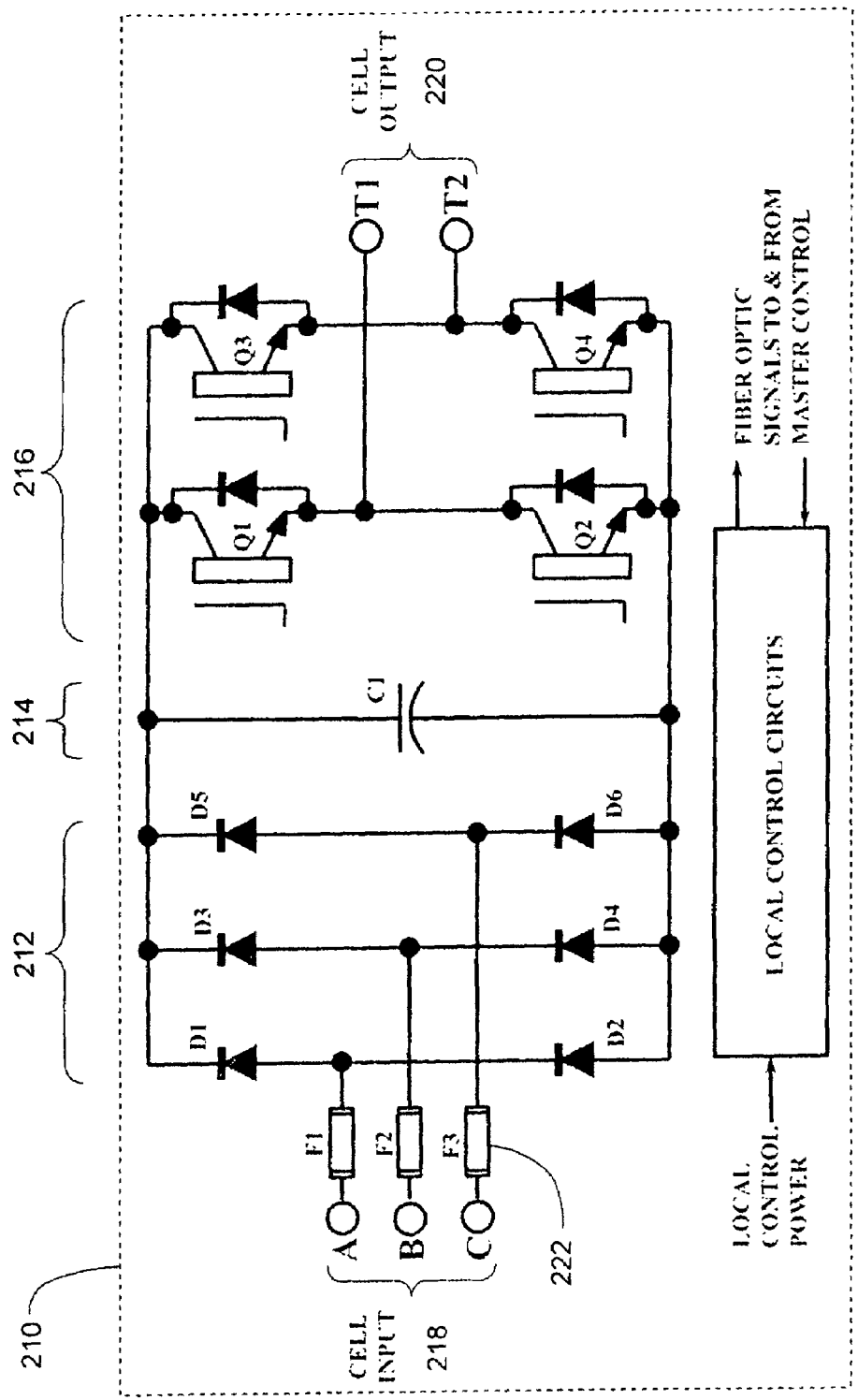
FIG. 2 illustrates various embodiments of a power cell of the power supply of FIG. 1.
Figure 3:
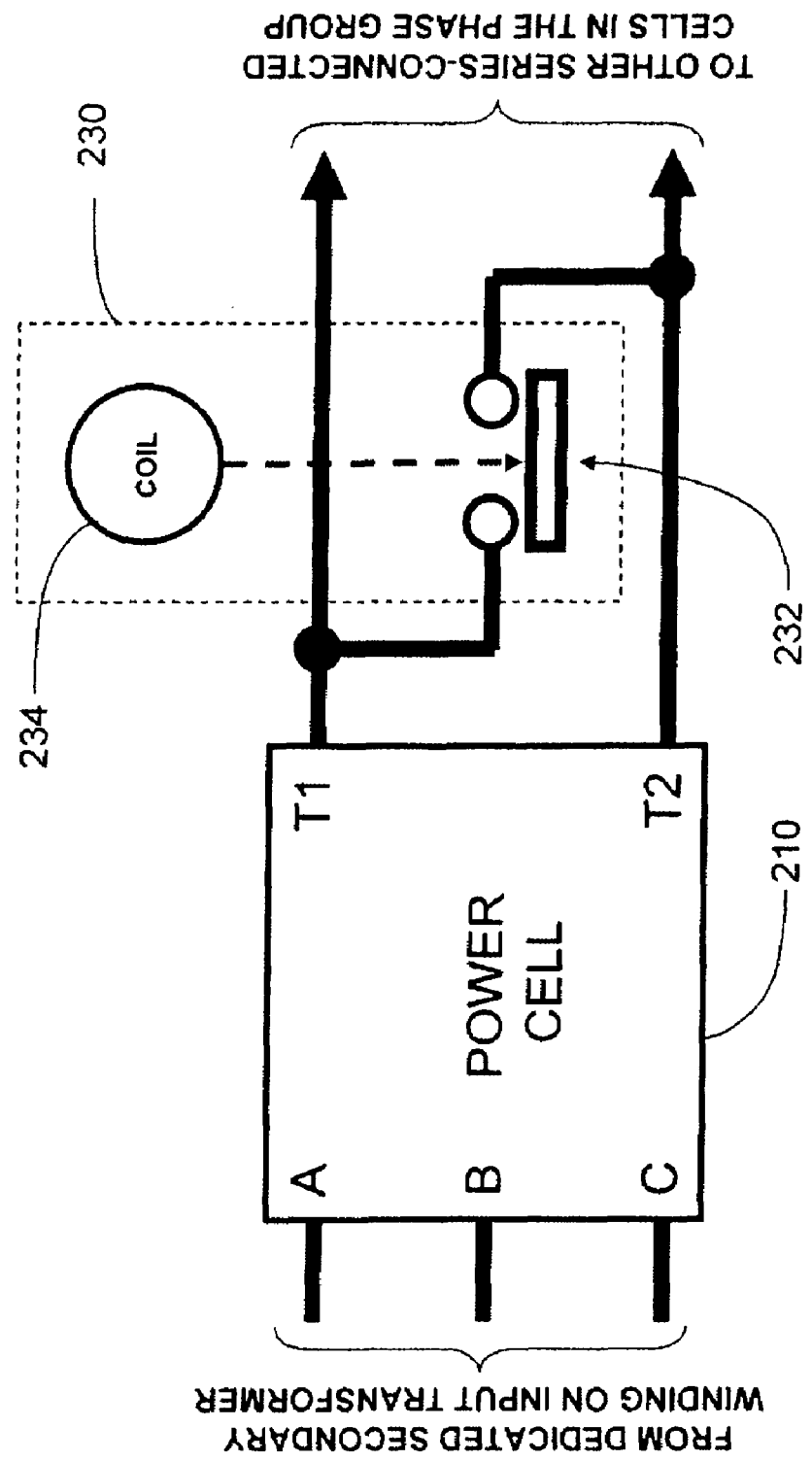
FIG. 3 illustrates various embodiments of a bypass device connected to an output of the power cell of FIG. 2.
Figure 4:
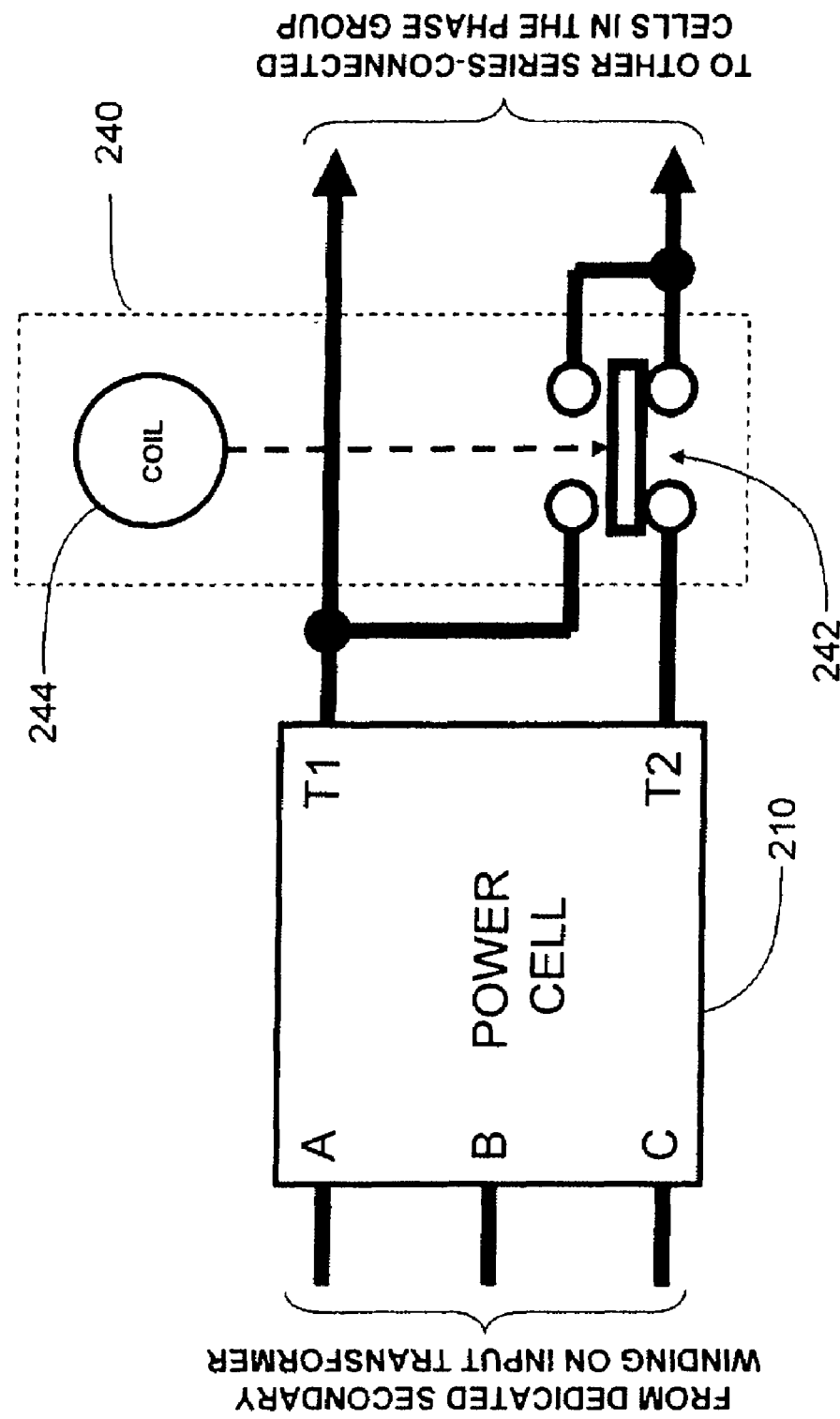
FIG. 4 illustrates FIG. 2; various embodiments of a bypass device connected to an output of the power cell of FIG. 5 illustrates various embodiments of a system for bypassing a power cell of a power supply.

The first and second switching devices L, S may be embodied in any suitable manner. For example, according to various embodiments, the switching devices L, S may be embodied as conventional contactors which are separate and apart from the male stab plugs 270 and/or the female receptacles 282. The first switching device L may be embodied as a contactor which connects one phase of a dedicated secondary winding (e.g., one phase of the secondary winding 114 of the transformer 110 of FIG. 1) to one of the former outputs of the power cell in order to prevent the secondary winding from floating at an indeterminate voltage referred to ground. The second switching device S may be embodied as a contactor which carries current from other power cells in a given phase-group of a multi-cell power supply.

Although switching device S is rated for full load current, switching device L can have a much smaller current rating. None of the male stab plugs 270, the female receptacles 282, or the switching devices L, S need to block any voltage higher than the cell input voltage. When a power cell experiences a failure, current through the power cell is interrupted electronically before the power cell is bypassed. According to various embodiments, the main contactor 111 may also be utilized to interrupt input fault currents. Thus, none of the male stab plugs 270, female receptacles 282, or switching devices L, S need to be capable of interrupting current.

Figure 9:
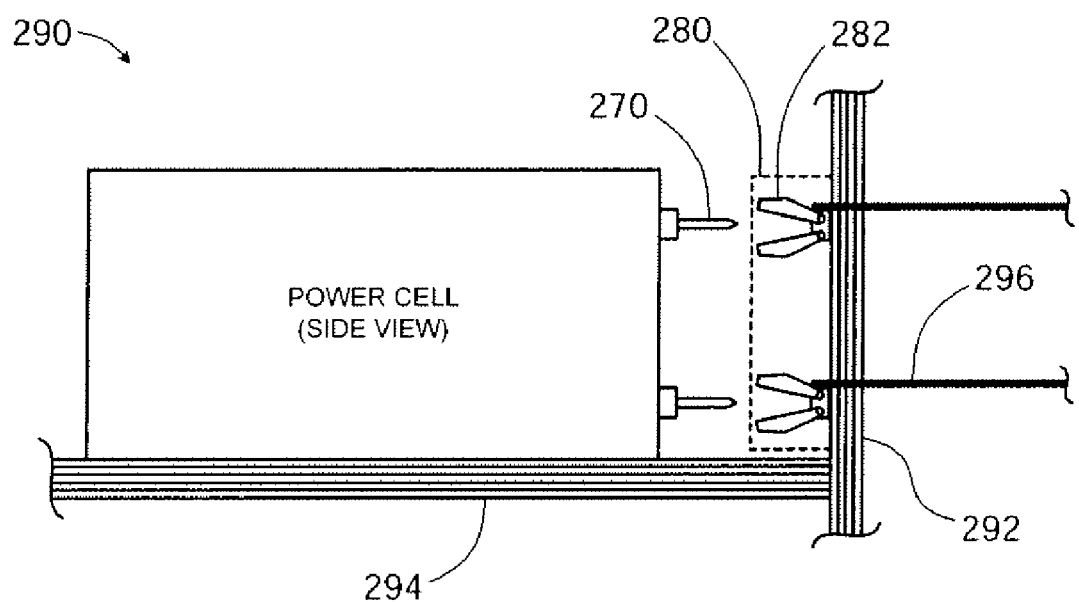
FIGS. 9-11 illustrate simplified representations of a power cell being installer in various embodiments of a power supply.
Figure 10:
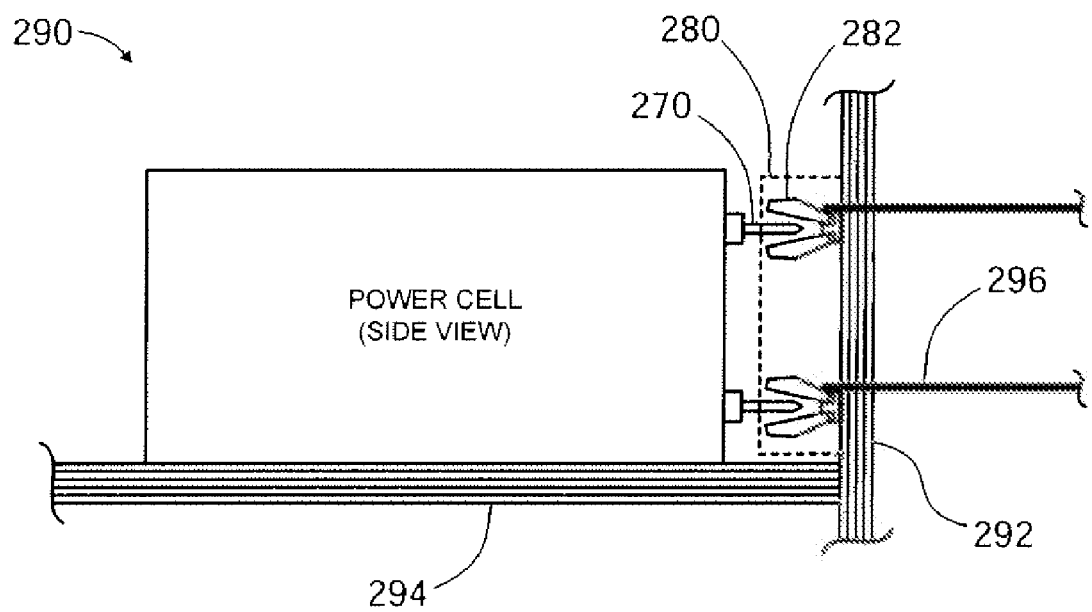
Figure 11:
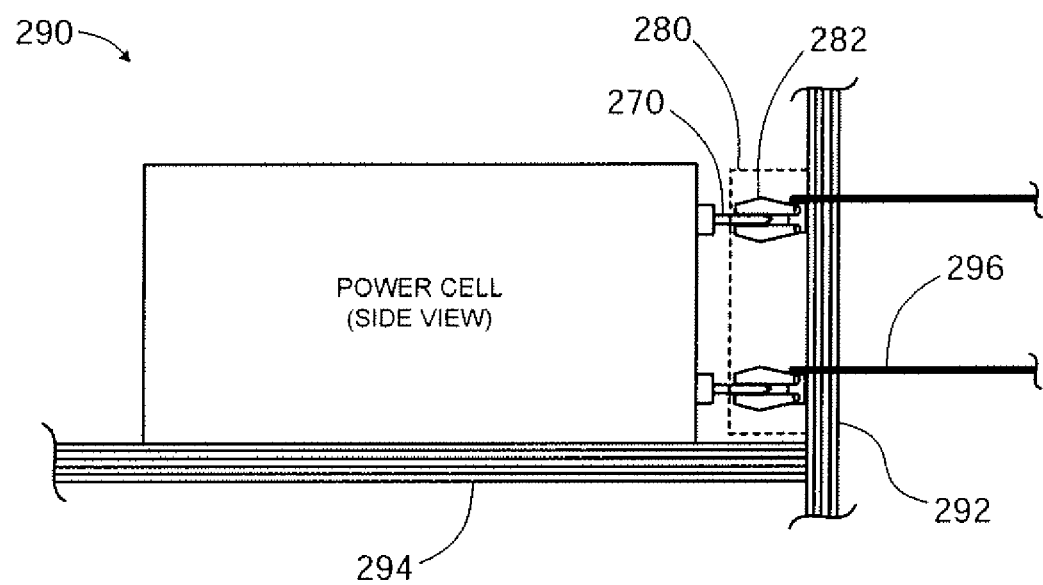

FIGS. 9-11 illustrate simplified representations of a power cell (e.g., the power cell of FIG. 7) being installed in various embodiments of a power supply 290. For purposes of clarity, only a portion of the power supply 290 is shown in FIGS. 9-11. As shown in FIGS. 9-11, the power supply 290 includes the bypass assembly 280 of FIG. 8, a first insulating member 292, and a second insulating member 294. The first insulating member 292 is connected to the second insulating member 294, and the bypass assembly 280 is connected to the first insulating member 292. The power supply 290 may also include conductors 296 (e.g., cables, bus bars, etc.) which electrically connect the female receptacles 282 of the bypass assembly 280 to other circuits. For purposes of clarity, only portions of the bypass assembly 280 which relate to physically connecting and disconnecting the power cell from the bypass assembly 280 are shown in FIGS. 9-11.

As shown in FIG. 9, as the power cell is moved toward the first insulating member 292, the female receptacles 282 are in the open position. Thus, there is no electrical connection between the power cell and the bypass assembly 280. As shown in FIG. 10, the female receptacles 282 may remain in the open position after the male stab plugs 270 of the power cell have been received by the female receptacles 282 of the bypass assembly 280. Thus, there is no electrical connection between the power cell and the bypass assembly 280. As shown in FIG. 11, the female receptacles 282 may be moved to the closed position after the male stab plugs 270 of the power cell have been received by the female receptacles 282, thereby making an electrical connection with the male stab plugs 270 of the power cell. Thus, when a given female receptacle 282 is closed against a corresponding male stab plug 270, the female receptacle 282 and the male stab plug 270 collectively form a contact.

Returning to FIG. 8, as the bypass assembly 280 provides both bypass and disconnect functionality, the bypass assembly 280 may have three operating modes. The three operating modes of the bypass assembly 280 may be designated as NORMAL, BYPASS, and RELEASE.

In the NORMAL, mode, each of the female receptacles 282 are in the closed position and are in physical and electrical contact with the corresponding male stab plugs 270. Thus, each of the input terminals A, B, C of the power cell are connected to a dedicated secondary winding (e.g., secondary winding 114 of the transformer 110 of FIG. 1), and each of the output terminals T1, T2 of the power cell are connected in series with other power cells in a given phase-group of a multi-cell power supply (e.g., power supply 290). Switching devices L, S are each in an open position such that one phase of a dedicated secondary winding is not connected to one of the outputs of the power cell, and the shunt path across the output terminals of the power cell is open.

In the BYPASS mode, only two of the female receptacles 282 are in the closed position, three of the female receptacles 282 are in the open position, switching device L is in the open position, and switching device S is in the closed position. Of the three female receptacles 282 in the open position, two of the three female receptacles 282 correspond to two of the three input terminals A, B, C of the power cell, and one of the three female receptacles 282 corresponds to one of the output terminals T1, T2 of the power cell. Thus, in the BYPASS mode, two of the three input terminals A, B, C of the power cell are disconnected from the dedicated secondary winding, one of the two output terminals T1, T2 of the power cell is disconnected from other power cells in a given phase-group of a multi-cell power supply, and the shunt path across the cell outputs is closed. One of the three input terminals of the power cell remains connected to the dedicated secondary winding, and one of the two output terminals of the power cell remains connected to other power cells in the given phase-group of the multi-cell power supply. By maintaining one input and one output connection, the power cell and the secondary winding are prevented from floating at an indeterminate voltage referred to ground while the power supply is operating.

In the RELEASE mode, each of the female receptacles 282 are in the open position, and switching devices L, S are each in the closed position. Thus, in the RELEASE mode, none of the female receptacles 282 are in electrical contact with the male stab plugs 270, each of the three input terminals A, B, C of the power cell are disconnected from the dedicated secondary winding, both of the output terminals T1, T2 of the power cell are disconnected from the other power cells in the given phase-group, and the shunt path across the cell outputs is closed. As none of the male stab plugs 270 are in physical contact with the female receptacles 282, the power cell can be easily removed from the power supply and a different power cell may be easily installed in its place. As the power supply may be operated in the RELEASE mode with the power cell removed, switching device L is closed so that one phase of the dedicated secondary winding is connected to one of the former outputs, thereby preventing the secondary winding from floating at an indeterminate voltage referred to ground.

Figure 12:
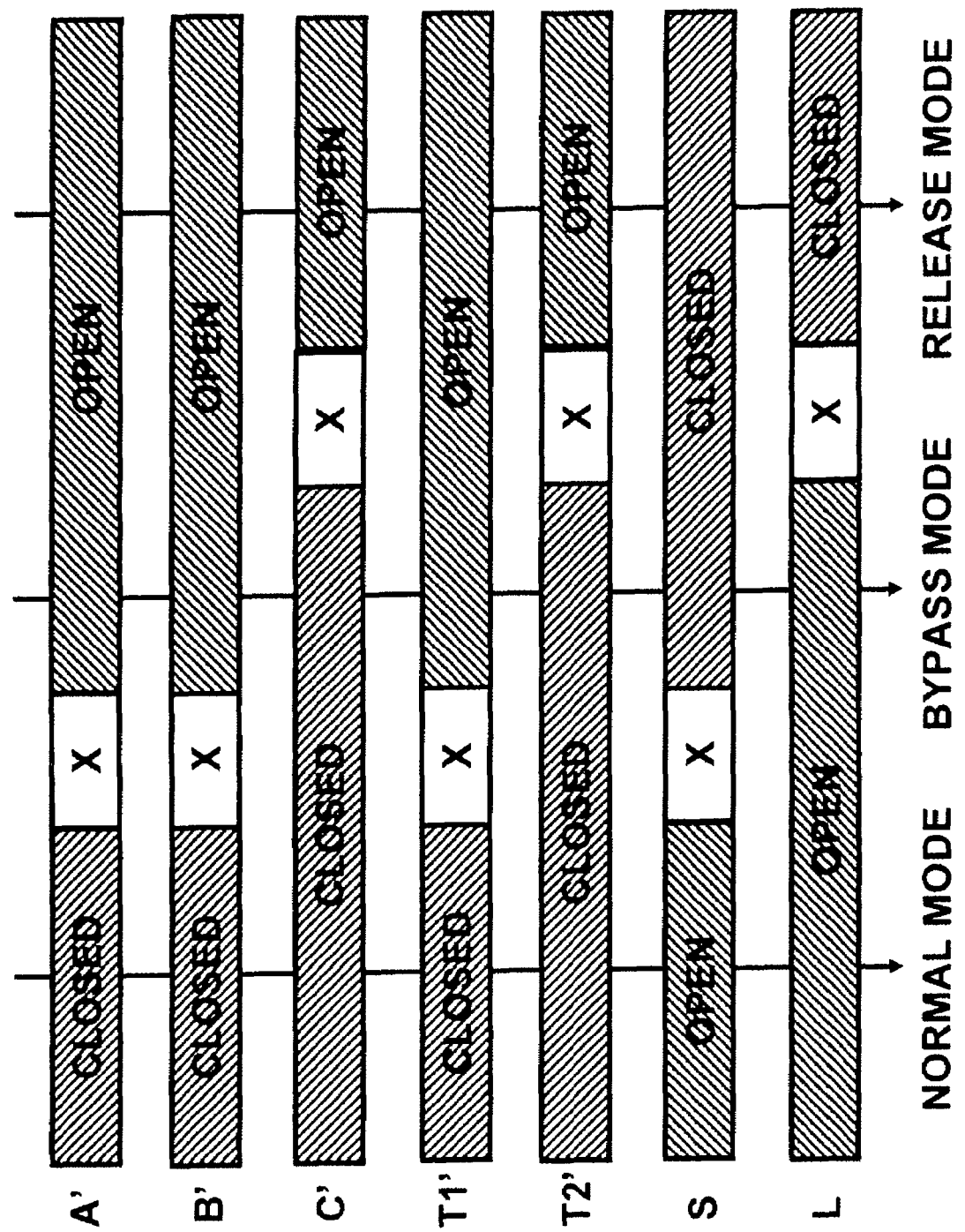
FIG. 12 is a state diagram of contacts of the bypass assembly of FIG. 8 according to various embodiments.

FIG. 12 is a state diagram of the female receptacles 282 and switching devices L, S of the bypass assembly 280 for each of the three operating modes according to various embodiments. In FIG. 12, the female receptacles 282 which engage the corresponding male stab plugs 270 are labeled A', B', C', T1', T2' respectively.

As described above, the female receptacles 282 and the switching devices L, S may be in different states depending on the operating mode of the bypass assembly 280. For example, as shown in FIG. 12, the female receptacles A' and B' and T1' are each in the closed position in the NORMAL mode, but are each in the open position in the BYPASS and RELEASE modes. The female receptacles C' and T2' are each in the closed position in the NORMAL and BYPASS modes, but are each in the open position in the RELEASE mode. The switching device S is in the open position in the NORMAL mode, but is in the closed position in the BYPASS and RELEASE modes. The switching device L is in the open position in the NORMAL and BYPASS modes, but is in the closed position in the RELEASE mode.

As shown in FIG. 12, when each switching device changes status, there may be a transition region where the status is unknown. Such transition regions are labeled X in FIG. 12. According to various embodiments, the bypass assembly 280 is able to detect and report the actual state of the switching devices S and L, and the detected state may be utilized to confirm proper configuration before enabling operation in a particular mode.

FIGS. 13A-C illustrate simplified representations of various views of a multi-cell power supply according to various embodiments. The power supply includes a power cell (e.g., the power cell of FIG. 7), the bypass assembly 280, and a handle 302 which is mechanically coupled to the bypass assembly 280 via, for example, a connecting rod 304. The handle 302, which may be accessed by an operator after the operator has satisfied all of the interlocks necessary to open one or more doors to the power cell compartment, may be utilized to change the operating mode of the bypass assembly 280. According to various embodiments the satisfaction of the interlocks includes de-energizing the transformer and waiting for the capacitors of the power cell to discharge. Although only one power cell, one bypass assembly 280 and one handle 302 are shown in FIGS. 13A-C, it will be appreciated that the multi-cell power supply may include any number of power cells, and have a different bypass assembly and handle for each power cell.

As shown in the side view of FIG. 13B, the handle 302 may have at least three operating positions which correspond to the NORMAL, BYPASS, and RELEASE modes of the bypass assembly 280. According to various embodiments, when a power cell is initially being installed, the handle 302 is placed in the RELEASE position (see the side view of FIG. 13C), thereby placing each of the female receptacles 282 in the open position, and placing each of the switching devices L, S in the closed position. The handle 302 and/or the bypass assembly 280 may include a mechanical interlock which operates to prevent the full seating of the power cell if the handle 302 is not in the RELEASE position.

After the male stab plugs 270 are received by the female receptacles 282, the operator may move the handle 302 to the NORMAL position (see the side view of FIG. 13B), thereby closing each of the female receptacles 282 to make electrical connections to the corresponding male stab plugs 270, and placing each of the switching devices L, S in the open position. The handle 302 may include a biasing member, and the act of moving the handle 302 from the RELEASE position to the NORMAL, position may operate to store energy in the biasing member.

According to various embodiments, once the handle 302 is in the NORMAL position, the bypass assembly 280 may be latched in the NORMAL mode of operation by, for example, a small solenoid. If the master control of the power supply later detected a malfunction which indicated that the power cell should be bypassed, the master control may first electronically interrupt the load current by inhibiting all the power cells. The master control may then check the current flowing into the primary winding of the transformer to confirm that no fault currents are flowing. If this check was affirmative, the master control may send a pulse of current to the solenoid. The pulse of current may cause the solenoid to release the biasing member, thereby moving the handle 302 from the NORMAL position to the BYPASS position, thereby causing the bypass assembly 280 to change from the NORMAL mode of operation to the BYPASS mode of operation.

Prior to removing or replacing a failed power cell which has been bypassed, the operator may manually move the handle 302 from the BYPASS position to the RELEASE position. The handle 302 and/or the bypass assembly 280 may include a mechanical interlock which operates to prevent the power cell from being removed if the handle 302 is not in the RELEASE position. Moving the handle 302 to the RELEASE position operates to move each of the female receptacles 282 to the open position, and to move the switching devices L, S to the closed position. At this point, the defective power cell can be removed and replaced.

To prevent accidentally returning the bypass assembly 280 to the NORMAL mode while the transformer is energized, according to some embodiments, the bypass assembly 280 can only be transitioned to the RELEASE mode manually, by moving the handle 302 to the RELEASE position. Prior to accessing the handle 302 to make the transition, the operator satisfies the respective interlocks, including de-energizing the main transformer.

Figure 14:
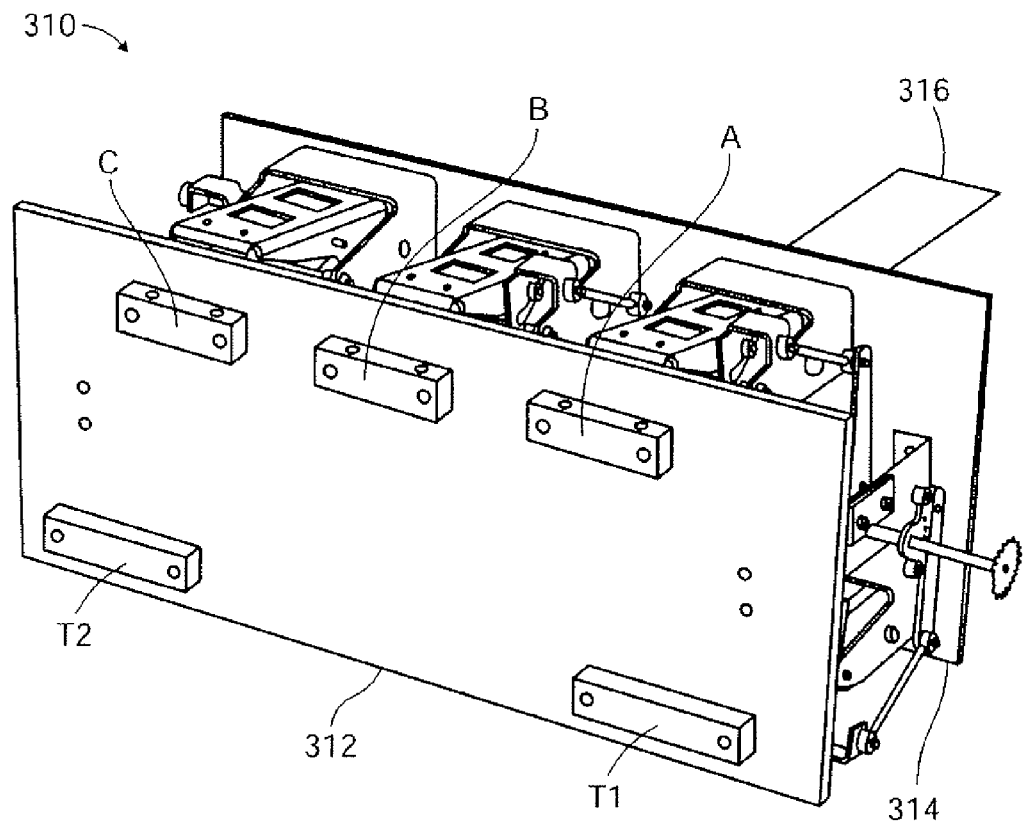
FIGS. 14-17 illustrate various views of various embodiments of a bypass assembly engaged with the male stab plugs of a power cell.
Figure 15:
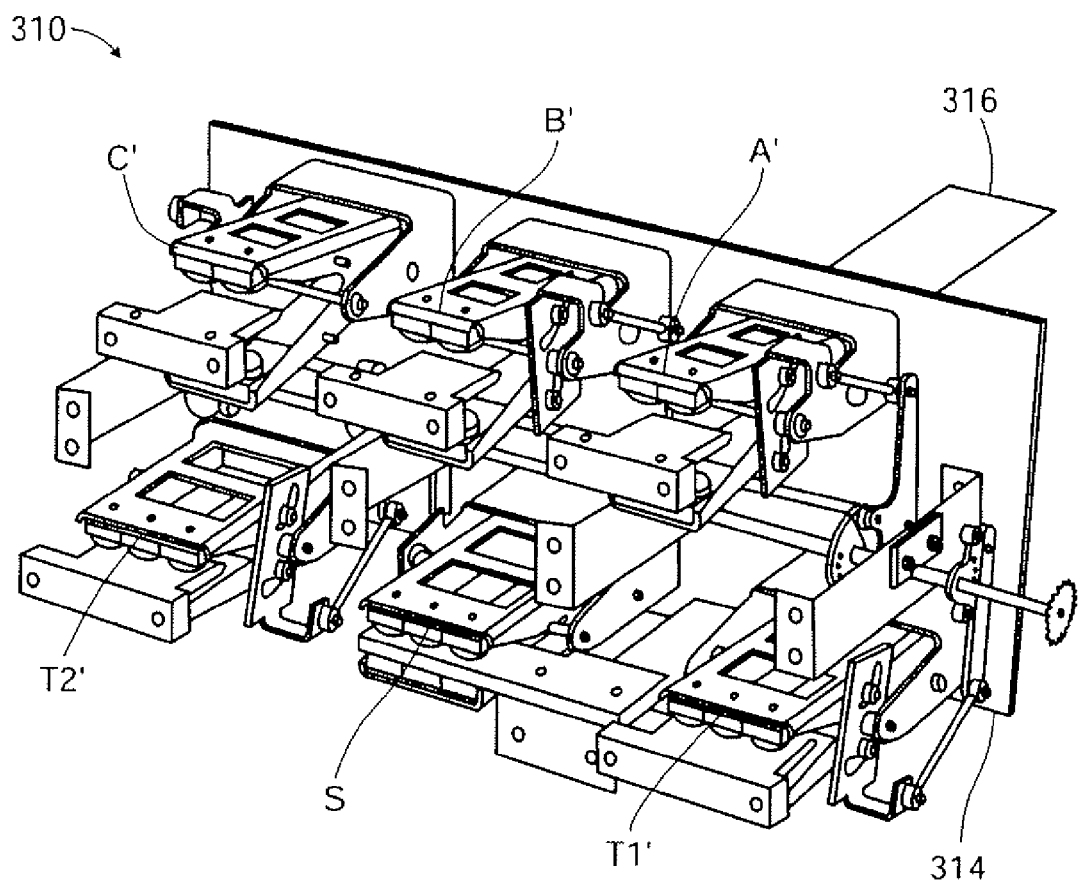

FIGS. 14-17 illustrate various views of various embodiments of a bypass assembly 310 engaged with the male stab plugs of a power cell (e.g., the power cell of FIG. 7). For purposes of clarity, no other portions of the power cell are shown, and only various portions of the bypass assembly 310 are shown. The bypass assembly 310 is similar to the bypass assembly 280 of FIG. 8, provides the same functionality, and may be utilized for power cells rated at, for example, 1250 output amperes. As shown in FIG. 15, the bypass assembly 310 includes female receptacles (respectively labeled as A', B', C', T1', T2') embodied as jaw-like structures, and some of the jaw-like receptacles are shown in the open position while others are shown in the closed position in order to illustrate both possibilities. The status of the jaws in these figures does not necessarily correspond to any of the operating modes of the bypass assembly 310.

As shown in the front perspective view of FIG. 14, the bypass assembly 310 includes a first insulating member 312 and a second insulating member 314. The first insulating member 312 may be considered a front panel of the bypass assembly 310 and the second insulating member 314 may be considered a rear panel of the bypass assembly 310. The male stab plugs (labeled A, B, C, T1, T2) of the power cell are shown as passing through the first insulating member 312 in FIG. 14. The second insulating member 314 carries terminals which serve as connection points for the conductors 316 which connect the bypass assembly 310 to the dedicated secondary winding and to the other cells in the phase-group as described hereinabove. At this current level, such conductors 316 are generally embodied as bus-bars. For purposes of clarity, only one of the conductors 316 is shown in FIG. 14.

As shown in the front perspective view of FIG. 15 (with the first insulating member 312 removed), the switching device S is positioned in the space between female receptacles T1' and T2'. The switching device S may be constructed from the same components as the female receptacles. For purposes of clarity, the switching device 1 is not shown in FIG. 15.

Figure 16:
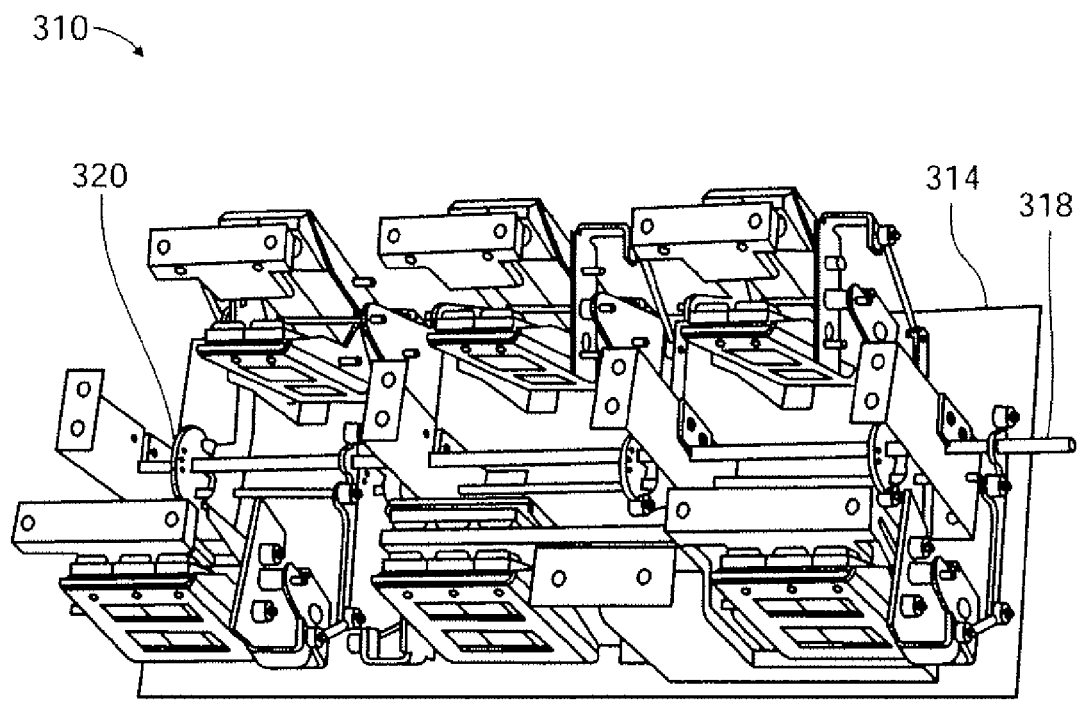

The front perspective view of FIG. 16 is similar to the front perspective view of FIG. 15, but shows the bypass assembly 310 from a different angle. The bypass assembly 310 includes a rotatable control shaft 318 which runs across the full width of the bypass assembly 310. The control shaft 318 operates to control the status of the various female receptacles and switching devices, depending on the operating mode of the bypass assembly 310. The bypass assembly 310 also includes a plurality of lobe-shaped cams 320 installed on the control shaft 318. Each lobe-shaped cam 320 corresponds to a different female receptacle or switching device, and the angle and duration of each lobe-shaped cam 320 are configured to provide the operating states shown in FIG. 12.

Figure 17:
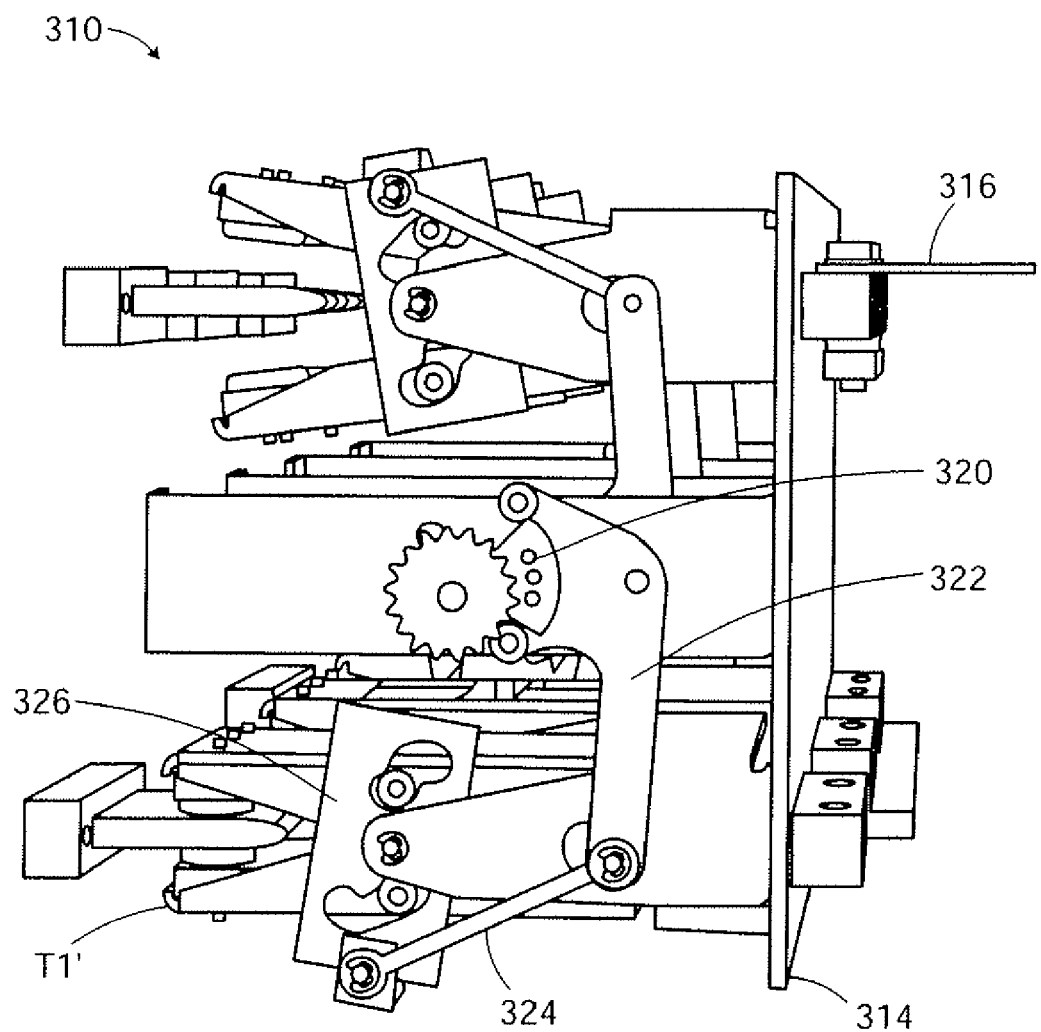

As shown in the end view of FIG. 17 (with the first insulating member 312 removed), the bypass assembly 310 includes a cam follower 322 coupled to the lobe-shaped cam 320 which corresponds to the female receptacle T1'. The cam follower 322 operates to convert the rotation of the lobe-shaped cam 320 to linear motion. The bypass assembly 310 further includes an insulating link 324 which connects the cam follower 322 to a slot cam 326, which controls the position of the female receptacles. Each of the female receptacles has a similar cam follower, insulating link, and slot cam.

When the handle 302 (shown in FIG. 13B) is moved from the NORMAL position to the BYPASS position to the RELEASE position, the control shaft 318 may be rotated by a linkage (not shown). The lobe-shaped cams 320 may be arranged so that each female receptacle is in the closed position when the handle 302 is in the NORMAL position, and each female receptacle is in the open position when the handle 302 is in the RELEASE position. However, as shown in FIG. 12, there may be some diversity when the handle 302 is in the BYPASS position. A situation in which some female receptacles and/or switching devices are in the closed position while other female receptacles and/or switching devices are in the open position can be created by modifying the shape and position of the cams on the rotating control shaft 318.

According to various embodiments, there may be a biasing member (e.g., a torsion spring) wound on the rotating control shaft 318 which resists its motion as the shaft turns from its BYPASS position toward its NORMAL position. For such embodiments, the operator may need to overcome the force of this biasing member as the position of the handle is changed. When the control shaft 318 reaches its NORMAL position, a catch may be engaged to hold the control shaft 318 in its NORMAL position. The catch may be able to be defeated manually by the operator, and it may also be released by a small solenoid on command from the master control.

According to various embodiments, a power supply which includes a bypass assembly as described hereinabove (e.g., bypass assembly 280 or bypass assembly 310) may be configured to ensure that the rank and phase-group of the control signals for the bypass assembly match the rank and phase-group of the control signals for the corresponding power cell. To ensure the matching, the power supply may be configured such that both signals arrive over the same medium. For example, a duplex fiber-optic cable or other communications medium from the master control system could be routed to the bypass assembly instead of to the power cell. For such embodiments, the bypass assembly may include a small local printed circuit board (PCB) which receives serial data via the duplex fiber-optic cable, decodes the serial data, and separates the serial data into bits representing commands for the bypass assembly and other bits representing commands for the power cell.

The command bits for the power cell may be forwarded to it over a second short fiber-optic cable or other communications medium. During the final seating of the power cell, a connector of the power cell may mate with a connector of the bypass assembly. Such a configuration may allow the local PCB of the bypass assembly to obtain control power from the power cell, and to pass control and status bits in parallel form.

According to various embodiments, the bypass assembly may also include a small control transformer to provide redundant control power, derived from the cell input voltage, to the local PCB. The PCB could receive the existing status bits from the power cell, and also status bits from the bypass assembly. The PCB could combine these bits to create serial data for transmission back to the master control system over the duplex fiber-optic cable. The control transformer may allow the PCB to communicate with the master control system even when a corresponding power cell is not installed.

According to various embodiments, the bypass assembly may be configured to detect and report the status of its own switches/contacts by including sensors (e.g., magnetic or other types) to detect the position of the rotating shaft. Another sensor may detect whether the male stab plugs of the power cell are fully inserted into the female receptacles of the bypass assembly.

The ability to disconnect the inputs to a defective power cell may reduce the possible damage to the power cell, and may, in some embodiments, permit fuse-less designs for the power cells. However, since the switches/contacts of the bypass assembly do not need to be capable of interrupting current, the master control system may be configured to confirm that no input current is present before issuing a bypass command. The master control system may also be configured to detect abnormal primary currents in the transformer after all power cells have been inhibited during a trip. If such currents are present, it may indicate that fault current is still flowing into a power cell. In such a circumstance, the main contactor may be opened before the bypass command is issued.

Figure 18:
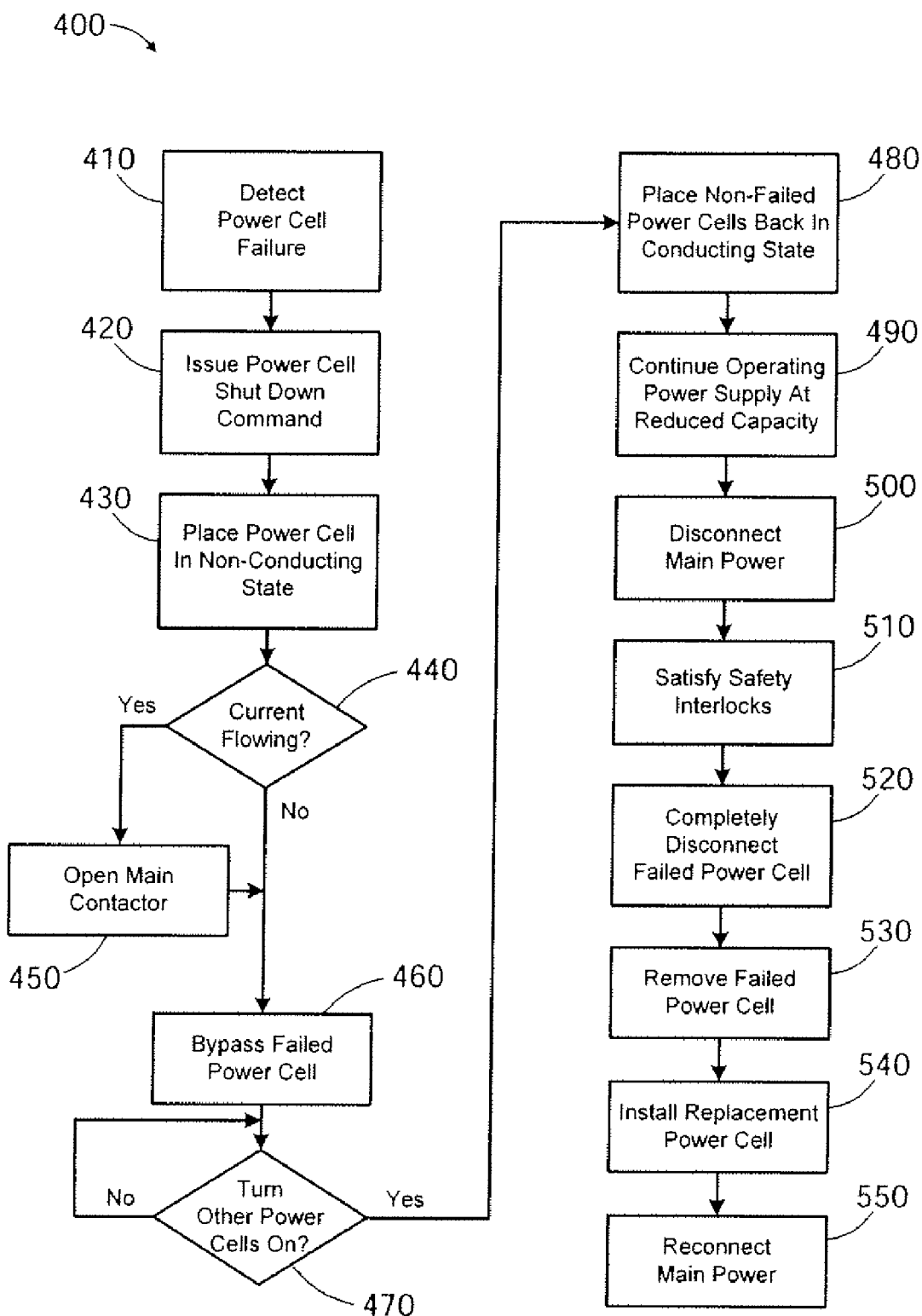
FIG. 18 illustrates various embodiments of a method for operating a multi-cell supply having an integrated bypass assembly.

FIG. 18 illustrates various embodiments of a method 400 for operating a multi-cell power supply having an integrated bypass assembly (e.g., the power supply of FIGS. 13A-C). The method 400 may be utilized to keep the power supply operational when one or more of its power cells experiences a failure. For purposes of simplicity, the method 400 will be described in the context of its use with the power supply of FIGS. 13A-C).

The process starts at block 410, where the power supply detects a failure in a given power cell. The master control system of the power supply may recognize that a given power cell has experienced a failure based, for example, on information communicated from the given power cell, on the fact that a given power cell has ceased communicating, etc. From block 410 the process advances to block 420, where the master control system communicates a global command to shut down each of the power cells of the power supply. From block 420, the process advances to block 430, where the power cells receive the shut down command and are placed in a non-conducting state. To realize the non-conducting state, the switching devices (e.g., IGBTs) in the H-bridge inverter of each power cell are turned off (e.g., the gating signals to the switching devices prevents the switching devices from conducting). When the switching devices are turned off, they essentially go open circuit, and cell current generally stops flowing within a few milliseconds. From block 430, the process advances to block 440, where it is determined whether any current is flowing in the failed power cell. This determination may be made, for example, by a measuring device within the failed power cell, by determining whether any abnormal current is flowing into the primary winding of the transformer, etc.

From block 440, the process advances to either block 450 or to block 460. If it is determined at block 440 that current is still flowing in the failed power cell, the process advances from block 440 to block 450, where the main contactor is opened, thereby stopping any current from flowing into the primary winding of the transformer, and stopping any current from flowing into the power cell. From block 450, the process advances to block 460.

If it is determined at block 440 that current is no longer flowing into the primary winding of the transformer, the process advances from block 440 to block 460, where the failed power cell is bypassed. According to various embodiments, the cell bypass is realized by moving each of the female receptacles A', B', T1' of the bypass assembly to an open position, and closing switching device S. By moving the three female receptacles to an open position, input power to the power cell is disconnected and an output from the power cell is disconnected from other power cells in the same phase-group. By closing switching device S, a shunt path is created between the female receptacle T1' and the conductor connected to female receptacle T2', thereby providing a path for current that formerly passed through the power cell. The closing of the switching device S may occur concurrently and/or simultaneously with the opening of the three female receptacles. At this point, the failed power cell is bypassed, thereby effectively reducing the maximum output capability of the power supply. During the above-described bypass process, the handle 302 corresponding to the bypassed cell is moved to the BYPASS position.

From block 460, the process advances to block 470, where it is determined whether the other power cells should be turned back on to operate the power supply at a reduced capacity. The determination may be based, for example, on whether a motor being driven by the power supply has a voltage requirement which is within the reduced capability of the power supply. If the determination made at block 470 is to delay turning the other power cells back on, the process at block 470 is repeated. According to various embodiments, a predetermined delay may be implemented prior to the process at block 470 being repeated.

If the determination made at block 470 is to turn the other power cells back on, the process advances to block 480, where the other power cells are placed back into the conducting state. The other power cells may be placed back into the conducting state by providing gating signals to the switching devices (e.g., IGBTs) in the respective f-bridge inverters which allow the switching devices to conduct. The period of time which elapses from the actions taken at block 430 (the turning off of all of the power cells) to the completion of the actions taken at block 480 (the turning back on of the non-bypassed power cells) is relatively brief, and may be brief enough to allow the user's application dependent upon the power supply to continue without incurring significant losses. Thus, the period of time that the power cells are in the non-conducting state may be considered temporary.

According to various embodiments, the process advances from block 480 to block 490, where the power supply continues to operate at reduced capacity while the user waits for a convenient opportunity to shut down the power supply. From block 490, the process advances to block 500, where the main power feeding the power supply is disconnected. The period of time which elapses from the actions taken at block 480 (the turning back on of the non-bypassed power cells) to the completion of the action taken at block 500 (the disconnecting of the main power) can be relatively long, and may be on the order of minutes, hours, days, weeks, months, or years depending on the specific application. Once the main power is disconnected, the power supply is out of operation, and the capacitors in the power cells begin to discharge.

From block 500, the process advances to block 510, where the various safety interlocks (e.g., main power is shut off, power cells are discharged, etc.) are satisfied to gain access to the bypassed power cell. From block 510, the process advances to block 520, where the bypassed power cell is completely disconnected from the secondary windings of the transformer and from the other power cells, and switching device L is closed. According to various embodiments, the complete disconnection is realized by moving each of the female receptacles C', T2' of the bypass assembly to an open position. The moving of the female receptacles C', T2' and the closing of the switching device L may be achieved by moving the handle 302 associated with the bypassed power cell from the BYPASS position to the RELEASE position. For embodiments of the bypass assembly where an impedance device is utilized in lieu of the switching device L, the actions taken at block 520 would be limited to completely disconnecting the failed power cell from the secondary windings of the transformer and from the other power cells in the same phase-group.

From block 520, the process advances to block 530, where the failed power cell is removed from the power supply. From block 530, the process may advance to block 540, where a replacement power cell is installed in the former position of the failed power cell. The installation may include, for example, connecting the replacement power cell to the secondary winding of the transformer and to the other power cells in the same phase-group. The connection may be realized by moving the female receptacles A', B', C'T1', T2' to the closed position, and opening switching devices L, S. The movement of the female receptacles A', B', C', T1', T2' and the opening of the switching devices L, S may be realized by moving the handle 302 from the RELEASE position to the NORMAL position.

From block 540, the process may advance to block 550, where the main power is reconnected to the power supply after various interlocks (doors closed, etc.) have been satisfied. At this point the capacitors in the power cells begin to re-charge, and the power supply once again becomes operational.

While several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A bypass assembly, comprising:
a plurality of movable terminals configured to mate with fixed terminals of a power cell of a power supply,
wherein at least one of the movable terminals and its corresponding fixed terminal collectively form a contact when the at least one of the movable terminals and the corresponding fixed terminal are mated, and
wherein the bypass assembly is configured to disconnect at least one of plurality of movable terminals from its corresponding fixed terminal to bypass at least a portion of the power cell.

2. The bypass assembly of claim 1, wherein the at least one movable terminal comprises a jaw-like receptacle.

3. The bypass assembly of claim 2, wherein the jaw-like receptacle comprises at least one of the following:
a first jaw member; and
a second jaw member.

4. The bypass assembly of claim 1, further comprising a switching device connected between two of the movable terminals.

5. The bypass assembly of claim 4, wherein:
a first of the two movable terminals is configured for connection to a secondary winding of a transformer; and
a second of the two movable terminals is configured for connection to another power cell of the power supply.

6. The bypass assembly of claim 4, wherein each of the two movable terminals are configured for connection to another power cell of the power supply.

7. The bypass assembly of claim 1, further comprising:
a first switching de ice connected between two of the movable terminals; and
a second switching device connected between one of the two movable terminals and another of the movable terminals.

8. The bypass assembly of claim 7, wherein:
a first of the two movable terminals is configured for connection to a secondary winding of a transformer;
a second of the two movable terminals is configured for connection to another power cell of the power supply; and
the another of the movable terminals is configured for connection to the another power cell of the power supply.

9. A power supply, comprising:

at least one power cell comprising a plurality of fixed terminals; and at least one of the bypass assembly comprising a plurality of movable terminals configured to mate with the fixed terminals of the at least one power cell, wherein at least one of the movable terminals and its corresponding fixed terminal collectively form a contact when the at least one of the movable terminals and the corresponding fixed terminal are mated, and wherein the bypass assembly is configured to disconnect at least one of plurality of movable terminals from its corresponding fixed terminal to bypass at least a portion of the power cell.

10. The power supply of claim 9, wherein the at least one movable terminal comprises a jaw-like receptacle.

11. The power supply of claim 10, wherein the jaw-like receptacle comprises at least one of the following:

a first jaw member; and a second jaw member.

12. The power supply of claim 9, further comprising a switching device connected between two of the movable terminals.

13. The power supply of claim 12, wherein:

a first of the two movable terminals is configured for connection to a secondary winding of a transformer; and a second of the two movable terminals is configured for connection to another power cell of the power supply.

14. The power supply of claim 12, wherein each of the two movable terminals are configured for connection to another power cell of the power supply.

15. The power supply of claim 9, further comprising:

a first switching device connected between two of the movable terminals; and a second switching device connected between one of the two movable terminals and another of the movable terminals.

16. The bypass assembly of claim 15, wherein:

a first of the two movable terminals is configured for connection to a secondary winding of a transformer;

a second of the two movable terminals is configured for connection to another power cell of the power supply; and the another of the movable terminals is configured for connection to the another power cell of the power supply.

17. The power supply of claim 9, wherein the power supply is a drive.

* * * * *